United States Patent [19]

Carothers et al.

[11] 4,261,132
[45] Apr. 14, 1981

[54] RODENT BAIT PROTECTION BOX

[76] Inventors: Robert E. Carothers, 208 Co. Rd. 800, Polk, Ohio 44866; Paul F. Moroney, 1300 Troy Rd., Ashland, Ohio 44805

[21] Appl. No.: 54,772

[22] Filed: Jul. 5, 1979

[51] Int. Cl.³ .................................. A01M 25/00
[52] U.S. Cl. ........................................... 43/131
[58] Field of Search ............... 43/131, 61; 220/264, 220/306, 307, 346

[56] References Cited

U.S. PATENT DOCUMENTS

| 1,393,590 | 10/1921 | Vaden | 43/131 |
| 1,481,922 | 1/1924 | Miller | 220/264 |
| 1,820,186 | 8/1931 | Gaskins | 43/131 |
| 2,683,326 | 7/1954 | Gardner | 43/131 |
| 4,026,064 | 5/1977 | Baker | 43/131 |
| 4,182,070 | 1/1980 | Connelly | 43/131 |

FOREIGN PATENT DOCUMENTS 1502258 3/1978 United Kingdom .................... 220/346

Primary Examiner—Nicholas P. Godici
Attorney, Agent, or Firm—Carothers and Carothers

[57] ABSTRACT

A rodent bait protection box which is secured with a lid and is adapted for containing rodent bait. A spring biased safety door is pivotally mounted inside the box to seal off a feed tray in the box from a rodent access opening in the side of the box. A lever mechanism is utilized to hold the safety door open, but once the rodent box is moved, the lever trips to permit the safety door to close so that people and animals cannot accidentally gain access to the poisoned bait.

6 Claims, 3 Drawing Figures

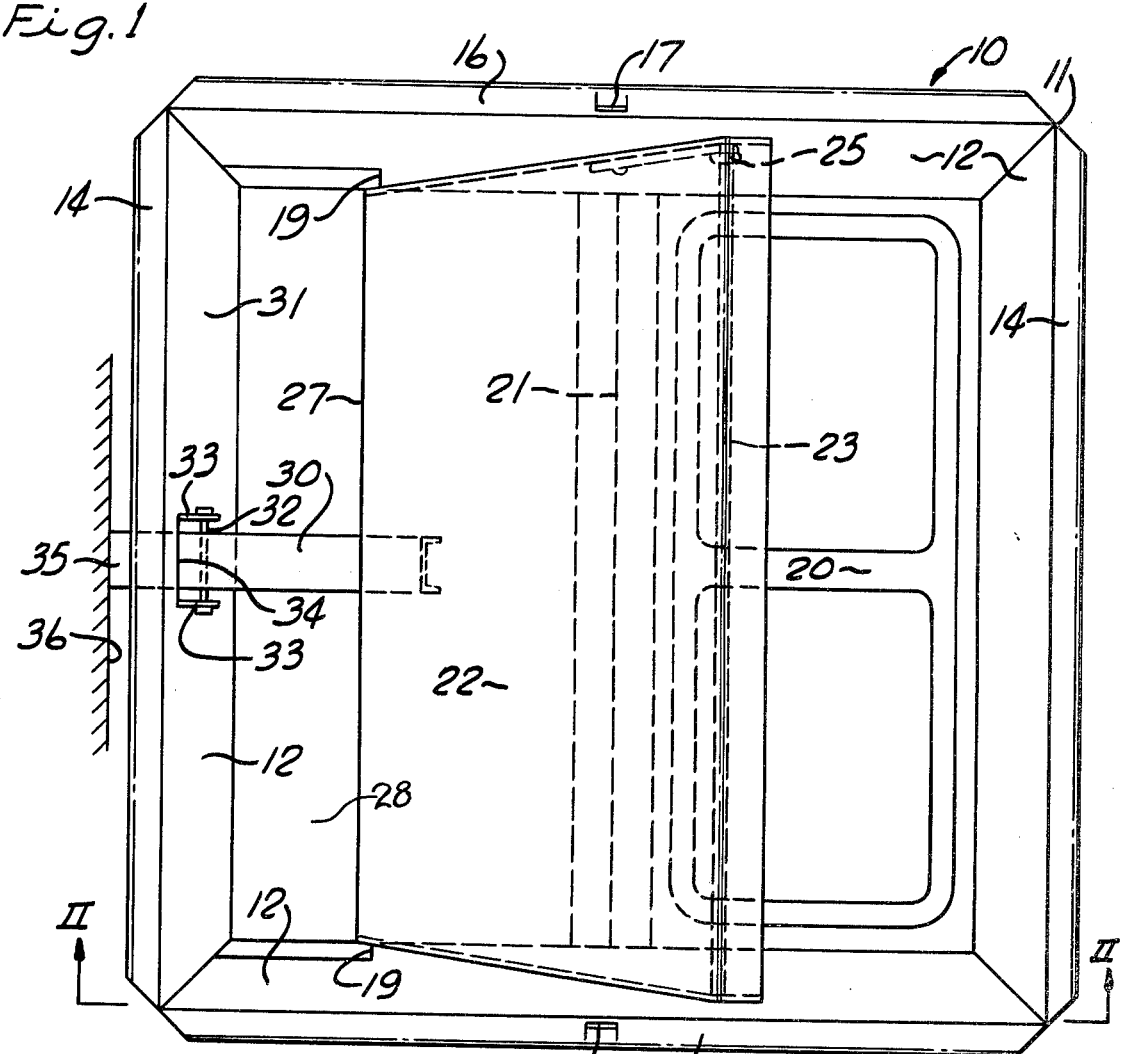
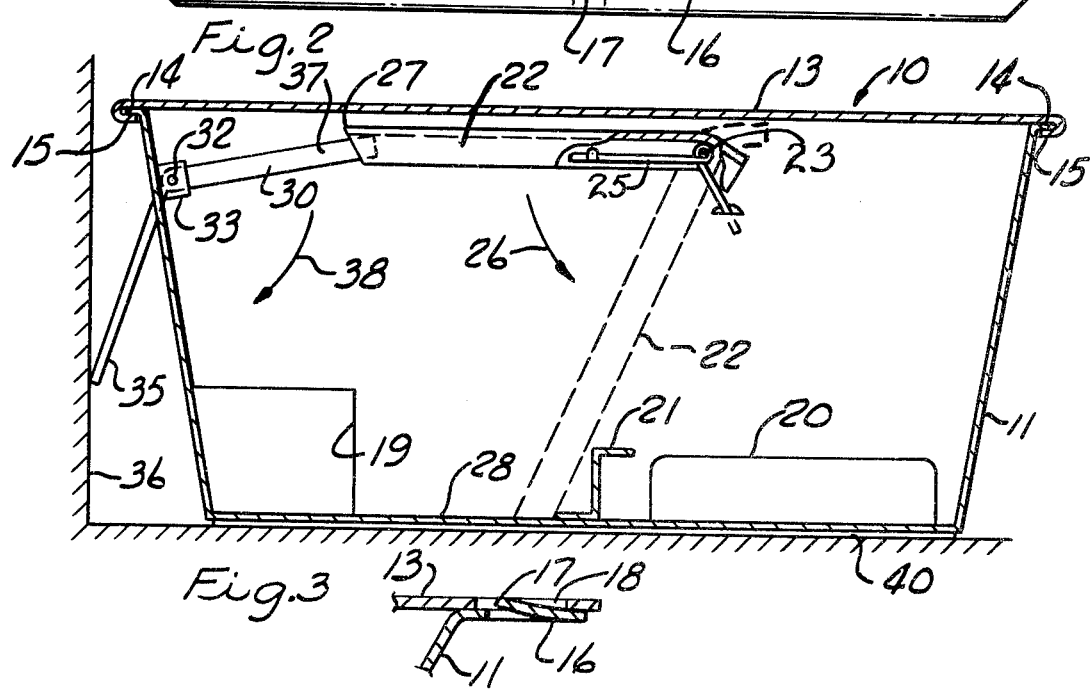

4,261,132

RODENT BAIT PROTECTION BOX

BACKGROUND OF THE INVENTION

The present invention relates to an improved structure or device for the feeding of rodents with rodenticides.

It is common to control rodents, particularly rats, by the use of poisoned feeds which are contained inside bait boxes, and the bait boxes have small openings or accesses through which the rodent can gain access to the poisoned feed. These rodent bait protection boxes are then positioned in places known to be frequented by the rodents.

The openings in the side of the bait boxes are only large enough for the rodents to gain access to the poisoned feed, the idea being that other animals and people cannot accidentally gain access to the poisoned feed. Examples of such prior art structures are illustrated in the Baker U.S. Pat. No. 4,026,064 and the Dill et al U.S. Pat. No. 3,298,128.

However, all of the presently existing rodent bait boxes have a safety drawback in that if the rodent boxes are accidentally tipped over by a person or animal, the poisoned feed can easily spill from the tray contained in the bait box and spill out of the rodent access openings in the sides of the box thus giving ready access of the poisoned feed to people or animals other than the intended rodents. This, of course, becomes a very serious problem when dealing with children or senile people who might ingest the poisoned feed, as these bait boxes are commonly used in many residential, farm, commercial and industrial locations where such people and animals frequent.

It is a principal object of the present invention to provide a safety rodent bait protection box which prevents the accidental spilling of poisoned feed to the exterior of the box, even if the box is picked up, tipped over or jostled by an animal or person.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a plan view of one embodiment of the rodent bait protection box of the present invention.

FIG. 2 is an end view of the rodent bait protection box of FIG. 1 as seen along section line II—II.

FIG. 3 is a segmented view in vertical section of a portion of the rodent bait protection box as illustrated in FIG. 2 illustrating the locking structure for the lid covering the bait box.

DETAILED DESCRIPTION OF THE PREFERRED EMBODIMENT

Referring to the drawings, the rodent bait protection box 10 of the present invention consists of a box 11 having four side walls 12 and a lid 13 (see FIG. 2) covering the box 11.

The top of the box 11 is square or rectangular in shape and has protruding top edges 14 on opposite sides which are embraced by inverted side bends 15 on the sides of the lid 13 for slide engagement of lid 13 over the top of box 11.

Lid 13 is locked to the top of box 11 by means of a detent type lock which is illustrated in FIG. 3 and also partially illustrated in FIG. 1. This detent type lock is provided between the protruding top edges 16 of box 11 and top 13, and consists of tongues 17 which are struck from protrusions 16 as indicated and penetrate aligned openings 18 in lid 13 when the lid is slid fully closed over box 11. Tongues 17 have spring capabilities as the box is made of metal, and when the tongues are struck therefrom, tongues 17 have resiliency. In order to open the box and slide the lid 11 off, one of the tongues 17 is engaged by one's finger through opening 18 and the tongue 17 is depressed downwardly so that the lid 13 may be slid over top of the otherwise protruding tongue 17. Other conventional lock arrangements may, of course, be utilized, such as the use of aligned openings between the protruding edges 16 and lid 13 and the use of an ordinary key type lock which is inserted through the aligned openings.

Rodent accesses 19 are provided in the bottom of the side walls as indicated to provide access for the rodents into the box so that they may feed from the sectioned tray 20. After lid 13 is removed, tray 20 is removable from the box for cleaning and refilling. Tray 20 is also further retained in position within box 11 by means of retaining lip 21. Tray 20 is sectioned so that liquid feed may be positioned in one side of the tray and solid feed positioned in the other side.

A novel feature of the present invention is the provision of a spring biased safety door 22 which is pivotally mounted inside box 11 to seal off feed tray 20 from accesses 19. In FIGS. 1 and 2, safety door 22 is illustrated in its open position. The dashed outline 22 in FIG. 2 illustrates the door 22 when it is in its closed position. Door 22 is pivotally mounted about rod or shaft 23 which, in turn, penetrates the side walls of box 11 for securement of the shaft. Door 22 is under the continuous spring bias of spring 25 which wraps about shaft 23 and continually urges door 22 downwardly toward its closed position as illustrated by arrow 26. Safety door 22 is shaped such that when it is in its fully closed position as illustrated in the dashed outline of FIG. 2, its side edges engage the side walls 12 of box 11 and its bottom edge 27 lies flush against bottom 28 of box 11 and its top edge 29 engages the underside of lid 13 to fully seal off the contents of tray 20 from the access openings 19. Thus, when safety door 22 is in its closed position, none of the poisoned content of tray 20 can find access to the exterior of box 11, even though the box may be tipped over or otherwise shaken or manipulated.

When the bait box 10 is in its normal mode of operation, safety door 22 must be held open against its bias, and this is accomplished by means of the bent lever 30 which penetrates side wall 31 and is pivotally connected to shaft 32 which in turn is secured to ears 33. Ears 33 are struck from side wall 31 to provide support for shaft 32 and also to provide opening 34 through which lever 30 passes. The outside portion 35 of lever 30 engages the wall 36 and the inside portion 37 of lever 30 engages the underside bottom edge 27 of safety door 22, and thus holds safety door 22 in its open position as illustrated in the Figures, against the bias of spring 25.

Thus, when box 10 is accidentally pulled away from the wall, the spring bias of spring 25 will cause lever 30 to rapidly drop as indicated by arrow 38 in FIG. 2, thereby simultaneously permitting safety door 22 to close. Then, all of the poison contained in tray 20 is sealed from accesses 19 thereby preventing animals and people from coming in contact with the poison. In order for the device to be re-used, a knowledgable operator must unlock lid 13, slide it off, then clean and refill tray 20 and then reset door 22 with lever 30 as illustrated in the Figures and position the box up against wall 36 as illustrated in the Figures to make certain that door 22 stays open so that the rodents may obtain access to the tray 20.

Rubber skids or strips 40 are provided on the bottom of box 11 to prevent it from skidding and to insulate the box floor or bottom and prevent it from sweating.

We claim:

1. A rodent bait protection box comprising a box having a bottom and a plurality of side walls defining an interior thereof, a lid for covering said box, lock means to secure said lid to said box, a rodent access disposed in one of said side walls, a feed tray retained in said box for holding rodent bait, a spring biased safety door pivotally mounted inside said box to seal off said feed tray from said access, and lever means penetrating said box and pivotally connected thereto and further adapted to engage an outside wall or floor surface to thereby hold said safety door open against its spring bias such that when said box is moved whereby said lever no longer engages said outside surface, said safety door will close under its spring bias.

2. The rodent bait protection box of claim 1 wherein said lever means consists of a lever arm penetrating one of said side walls and pivotally connected thereto, the portion of said lever outside of the box adapted to engage an outside wall and the portion of said lever inside said box adapted to engage an edge of said safety door to hold it open while said outside portion of said lever is in engagement with a wall surface.

3. The rodent bait protection box of claim 1 including non-skid sheet material secured to the outside bottom of said box.

4. The rodent bait protection box of claim 1 wherein the top of said box is rectangular and has protruding top edges on opposite sides which are embraced by inverted side bends on the sides of said lid for sliding engagement of said lid over said box.

5. The rodent bait protection box of claim 4 wherein said lock means consists of detent type lock between a protruding top edge of said box and an end of said lid with a tongue struck from one penetrating and aligned opening in the other when said lid is slid fully closed over said box.

6. The rodent bait protection box of claim 1 wherein said spring biased safety door is pivotally mounted inside said box such that the free end of the door is positioned between the pivoted edge of said door and said rodent access such that said door pivots toward the rodent access as opposed to pivoting away from the rodent access.

* * * * *